(12) United States Patent
Hurst et al.

(10) Patent No.: US 8,104,255 B1
(45) Date of Patent: Jan. 31, 2012

(54) LAWN MOWER HAVING SELECTIVELY USABLE SIDE DISCHARGE CHUTE

(75) Inventors: John O. Hurst, Lakeville, MN (US); Chris A. Wadzinski, Inver Grove Heights, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 12/617,030

(22) Filed: Nov. 12, 2009

Related U.S. Application Data

(60) Provisional application No. 61/114,383, filed on Nov. 13, 2008.

(51) Int. Cl.
*A01D 67/00* (2006.01)

(52) U.S. Cl. ......................................... 56/320.2; 56/220

(58) Field of Classification Search .................. 56/320.2, 56/202, 17.4
See application file for complete search history.

(56) References Cited

U.S. PATENT DOCUMENTS

| | | | | |
|---|---|---|---|---|
| 3,132,457 A * | 5/1964 | Slemmons | ...................... | 56/202 |
| 3,420,041 A | 1/1969 | Cope | | |
| 3,706,190 A * | 12/1972 | Taub | .............................. | 56/13.4 |
| 3,721,078 A | 3/1973 | Haffner | | |
| 3,760,572 A * | 9/1973 | Marion et al. | ................ | 56/320.2 |
| 3,872,656 A * | 3/1975 | Dahl | .............................. | 56/202 |
| 3,925,972 A | 12/1975 | Andersson | | |
| 4,226,074 A | 10/1980 | Mullet et al. | | |
| 4,378,668 A * | 4/1983 | Gullett | .......................... | 56/12.7 |
| 4,726,178 A * | 2/1988 | Mallaney et al. | ................ | 56/202 |
| 5,040,364 A * | 8/1991 | Deegan | ........................ | 56/320.2 |
| 5,133,175 A * | 7/1992 | Dumbrell | ........................ | 56/17.4 |
| 5,442,902 A | 8/1995 | Mosley et al. | | |
| 5,499,494 A | 3/1996 | Boshell et al. | | |
| 6,874,309 B1 | 4/2005 | Bellis, Jr. | | |
| 6,971,224 B1 * | 12/2005 | Hancock | ........................ | 56/320.2 |
| 7,051,504 B2 * | 5/2006 | Osborne | ........................ | 56/320.2 |
| 7,448,195 B2 * | 11/2008 | Kohler | .......................... | 56/320.2 |
| 2008/0134654 A1 * | 6/2008 | Kohler | .......................... | 56/320.2 |
| 2009/0031690 A1 | 2/2009 | Kallevig et al. | | |
| 2009/0301050 A1 * | 12/2009 | Kohler | .......................... | 56/320.2 |

* cited by examiner

*Primary Examiner* — Arpad Fabian-Kovacs
(74) *Attorney, Agent, or Firm* — James W. Miller

(57) ABSTRACT

A lawn mower includes a housing having a cutting chamber defined by a top wall and a circumferential sidewall. A side discharge opening is provided on the sidewall. A side discharge chute selectively opens and closes the discharge opening. The discharge chute has a side door pivoted to the sidewall about a vertical pivot axis and a top deflector pivoted to the side door about a substantially horizontal pivot axis. When the discharge chute is in an open position to open the discharge opening to the flow of grass clippings, the top deflector pivots downwardly on the side door into an inclined position to intercept the grass clippings and direct them downwardly towards the ground.

5 Claims, 7 Drawing Sheets

LAWN MOWER HAVING SELECTIVELY USABLE SIDE DISCHARGE CHUTE

CROSS REFERENCE TO RELATED APPLICATIONS

This application claims the benefit of one or more previously filed copending provisional applications identified as follows: Application Ser. No. 61/114,383 filed Nov. 13, 2008.

TECHNICAL FIELD

This invention relates to a rotary lawn mower having a cutting chamber in which a cutting blade rotates about a substantially vertical axis in a substantially horizontal cutting plane to cut grass.

BACKGROUND OF THE INVENTION

Lawn mowers are well known devices for cutting grass and the like. Typically, most lawn mowers intended for home use have a housing that includes an annular or doughnut shaped cutting chamber having a top wall and a curved sidewall. A substantially horizontal cutting blade is located within the cutting chamber and rotates about a vertical axis to cut grass in a substantially horizontal cutting plane. The grass clippings created by the action of the blade are circulated around inside the cutting chamber confined by the various walls of the cutting chamber.

The grass clippings are allowed to leave the cutting chamber of the mower in various ways. One well known way is to provide a side discharge opening in a sidewall of the mower between the front and rear wheels thereof. When the side discharge opening is open, grass clippings circulating in the cutting chamber will exit through the side discharge opening when the clippings reach such opening. Thus, the grass clippings are thrown to the side of the mower in a sideward and somewhat rearward direction.

In side discharge mowers of the type noted above, it is desirable that some type of chute be provided over or around the side discharge opening to protect the operator and bystanders from the stream of the grass clippings passing out of the side discharge opening and from any foreign objects carried in that grass stream. Various types of chutes are known that are attached to the lawn mower to be capable of covering or blocking the side discharge opening but that can be selectively deployed to open the side discharge opening with the chute then at least partially covering the side discharge opening. However, such known chutes have various disadvantages, such as lack of durability, complexity, and failure to direct the exiting stream of grass clippings in the most desirable manner. It would be an advance in the art to provide a side discharge chute that avoids such disadvantages.

SUMMARY OF THE INVENTION

One aspect of this invention relates to an improved lawn mower of the type having a downwardly facing cutting chamber that includes a top wall and a circumferential sidewall. The sidewall has a side discharge opening therein. A side discharge chute has a closed position in which the discharge opening is covered and closed off and an open position in which the discharge opening is uncovered to allow grass clippings circulating inside the cutting chamber to flow through the uncovered discharge opening and to thereby exit the cutting chamber. The improvement relates to the side discharge chute which comprises a side door and a top deflector. The side door pivots on the sidewall of the cutting chamber about a substantially vertical pivot axis. The side door in the closed position of the discharge chute lies adjacent the sidewall to overlie and close off the discharge opening. The side door in the open position of the discharge chute has been pivoted outwardly relative to the sidewall about the vertical pivot axis so that the side door has swung away from and opened the discharge opening. The top deflector pivots on the side door about a substantially horizontal pivot axis. The top deflector in the closed position of the discharge chute rests atop the top wall of the cutting chamber. The top deflector in the open position of the discharge chute has cleared the top wall of the cutting chamber to be able to pivot downwardly relative to the side door about the substantially horizontal pivot axis.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
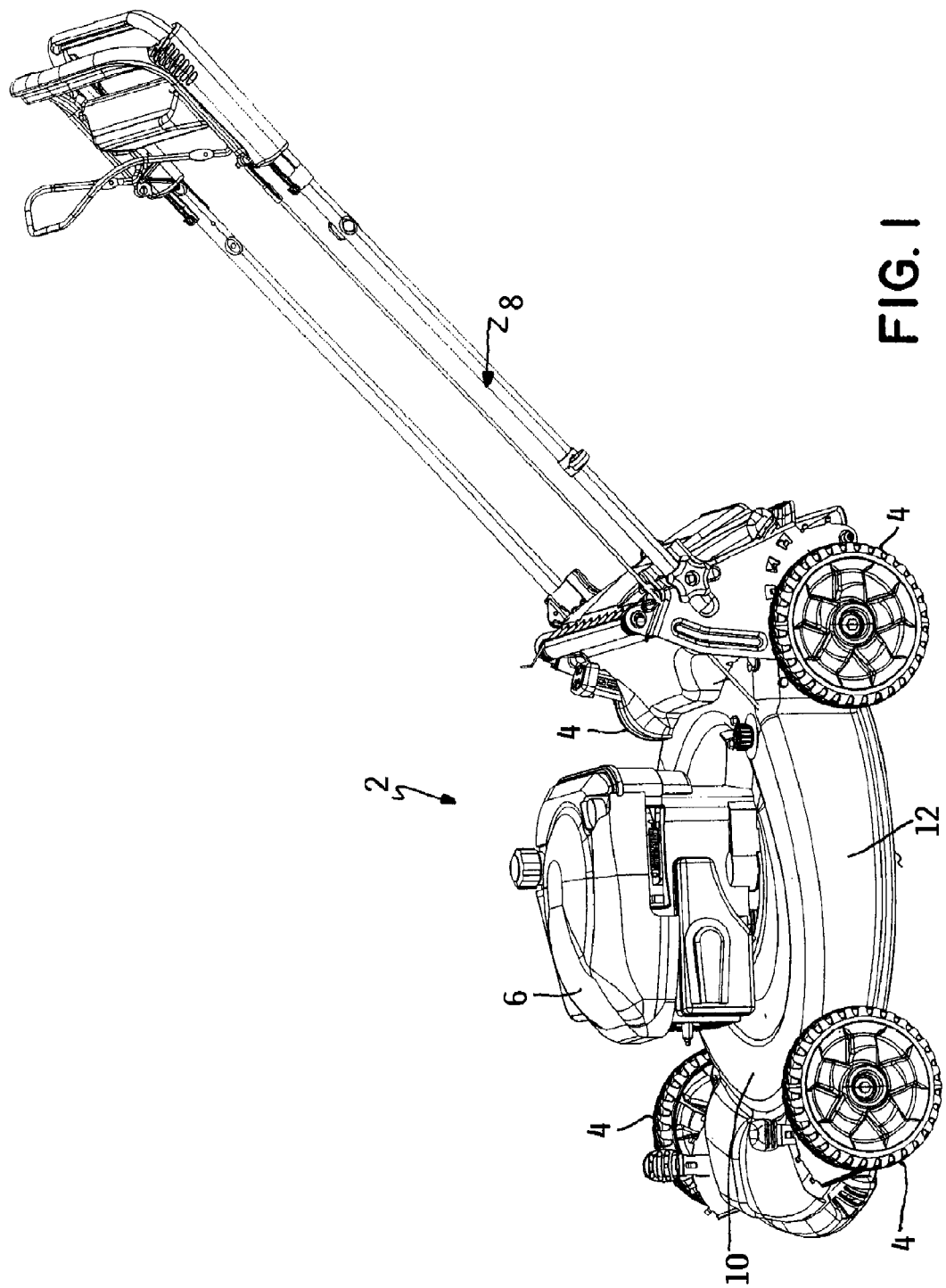
FIG. 1 is a perspective view of a lawn mower according to this invention.

A typical rotary lawn mower of the type to which this invention relates is illustrated in FIG. 1 as 2. Mower 2 is supported by wheels 4 or other rotatable ground engaging members for movement over the ground, has an engine 6 or other power source for providing power, and has an upwardly and rearwardly extending handle assembly 8 for allowing a user to walk behind mower 2 during operation of mower 2. A cutting blade (not shown) rotates in a downwardly facing cutting chamber of mower 2 defined by a top wall 10 and a circumferential sidewall 12 of mower 2.

Figure 2:
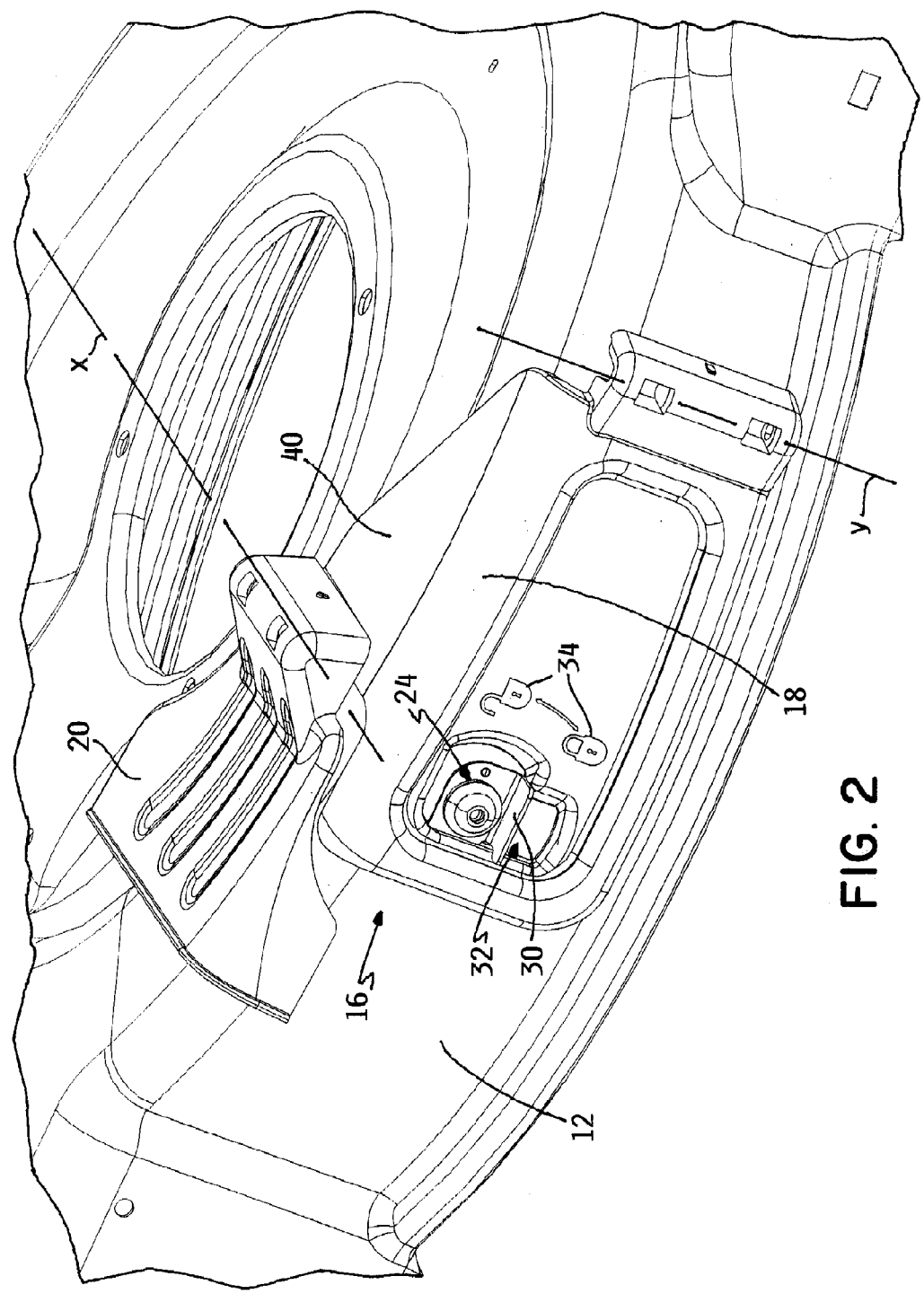
FIG. 2 is a perspective view of one side of the lawn mower of FIG. 1, particularly illustrating a side discharge chute in a closed position relative to a side discharge opening provided in a sidewall of the mower.
Figure 3:
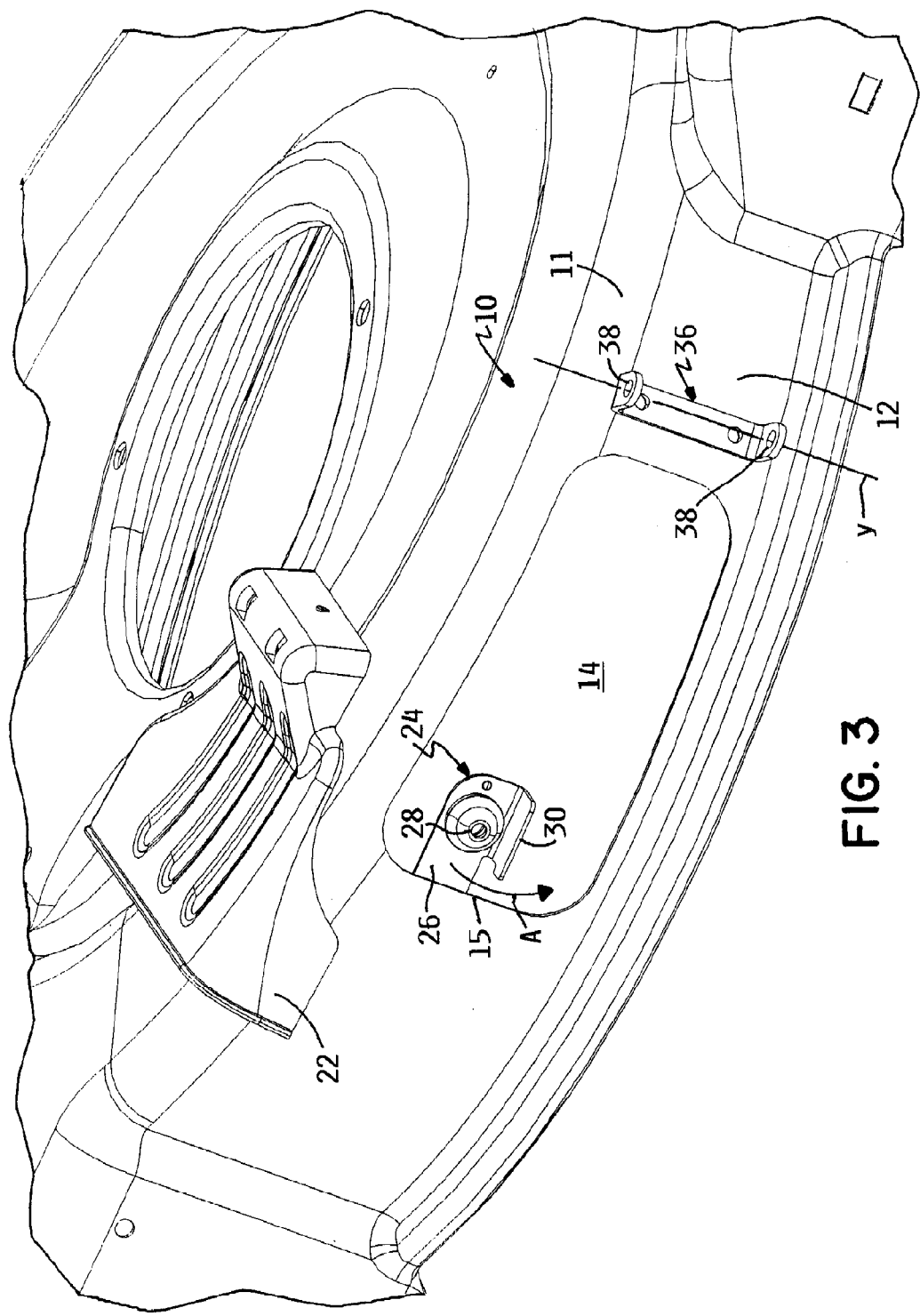
FIG. 3 is a perspective view similar to FIG. 2 but with the side door of the discharge chute having been removed for the purpose of clarity, particularly illustrating the discharge opening in the sidewall of the mower and a latch for holding the discharge chute in the closed position thereof, the latch being shown in an engaged position.

The sidewall on one side of mower 2 includes a side discharge opening 14 that is best shown in FIG. 3. A side discharge chute 16 has a closed position shown in FIGS. 2-4 in which discharge opening 14 is covered and closed off. When discharge chute 16 is closed, the grass clippings circulating around the cutting chamber can exit mower 2 only rearwardly through a rear discharge opening that leads to a grass collector (not shown) or downwardly through the open bottom face of the cutting chamber. Discharge chute 16 also has an open position shown in FIGS. 5-7 in which discharge opening 14 is uncovered. When discharge chute 16 is open, the grass clippings circulating around the cutting chamber exit the cutting chamber through discharge opening 14.

Discharge chute 16 includes two major components: 1.) a side door 18 that pivots on sidewall 12 of the cutting chamber about a substantially vertical pivot axis y, and 2.) a top deflector 20 that pivots on side door 18 about a substantially horizontal pivot axis x. In the closed position of discharge chute 16 shown in FIGS. 2-4, side door 18 has been pivoted inwardly relative to sidewall 12 so that the curved shape of side door 18, which mimics the shape of the curve in sidewall 12 of mower 2, lies substantially flush against sidewall 12 of mower 2 to overlie and close off discharge opening 14. In the closed position of discharge chute 16 shown in FIGS. 2-4, top deflector 20 of discharge chute 16 rests atop the top wall 10 of mower 2. The radially outer side of top deflector 20 can include a downwardly extending vertical lip 22 that nests against the upper portion of sidewall 12 of mower 2 and against the curved transition section 11 between top wall 10 and sidewall 12 of mower 2. See FIG. 4. Side door 18 and top deflector 20 are preferably made of substantially rigid and shape retaining materials, such as metal or hard plastic or other equivalent materials, to be durable and long lasting.

Figure 5:
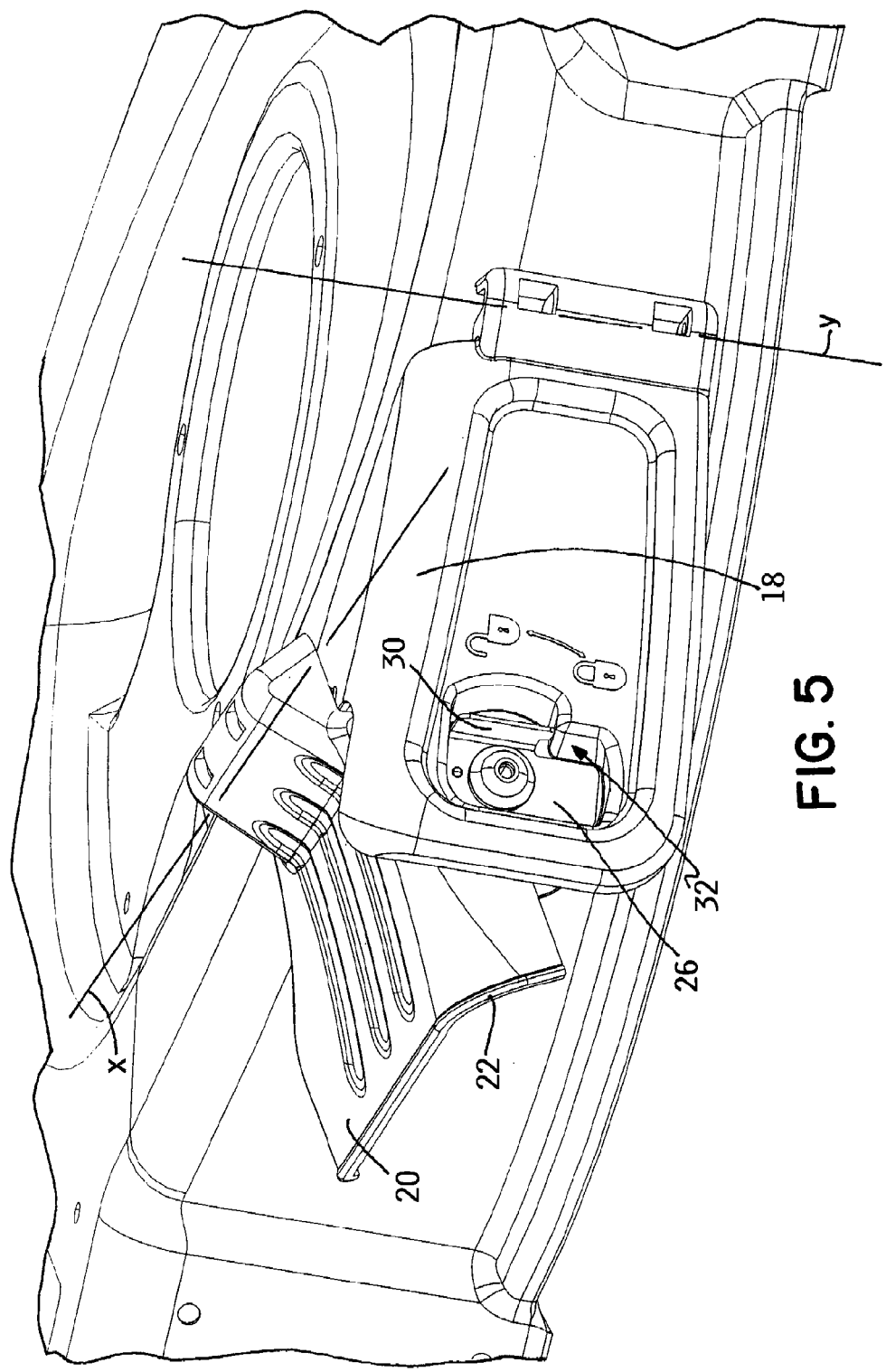
FIG. 5 is a perspective view similar to FIG. 2, but particularly illustrating the side discharge chute in an open position relative to the discharge opening.
Figure 6:
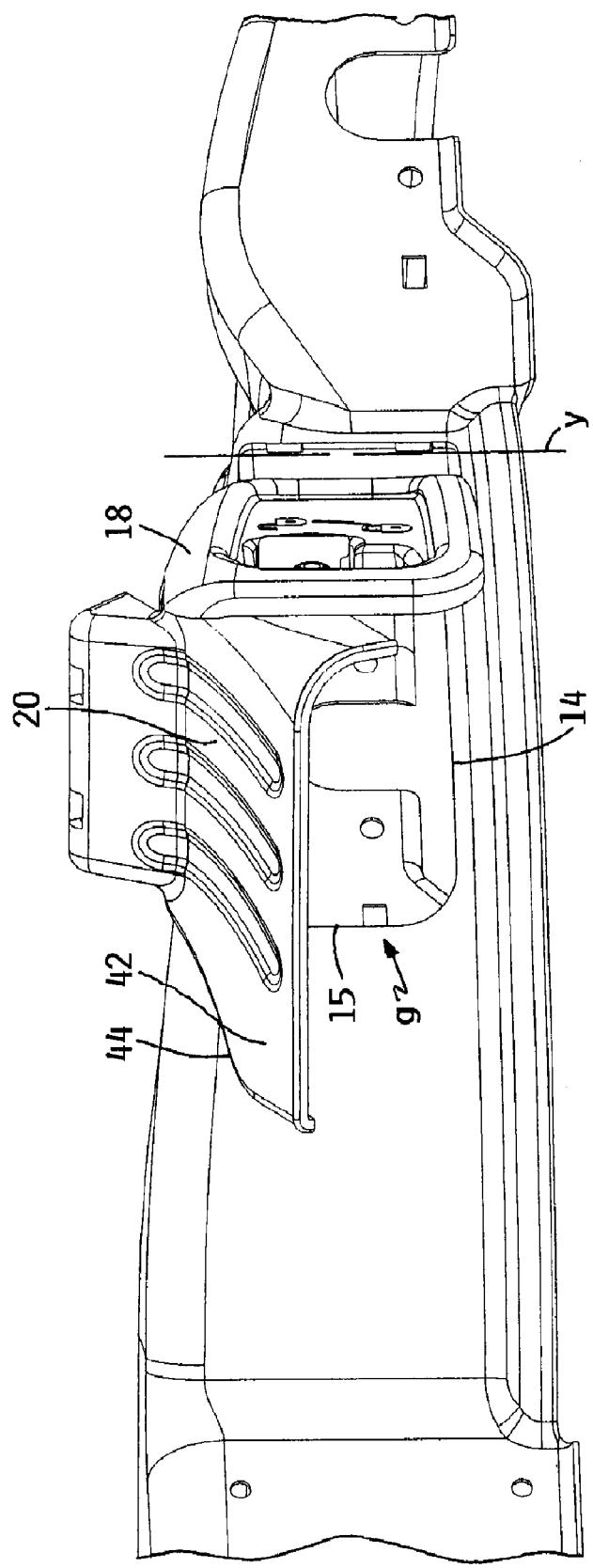
FIG. 6 is a perspective view of the discharge chute in the open position thereof from the rear of the discharge chute.
Figure 7:
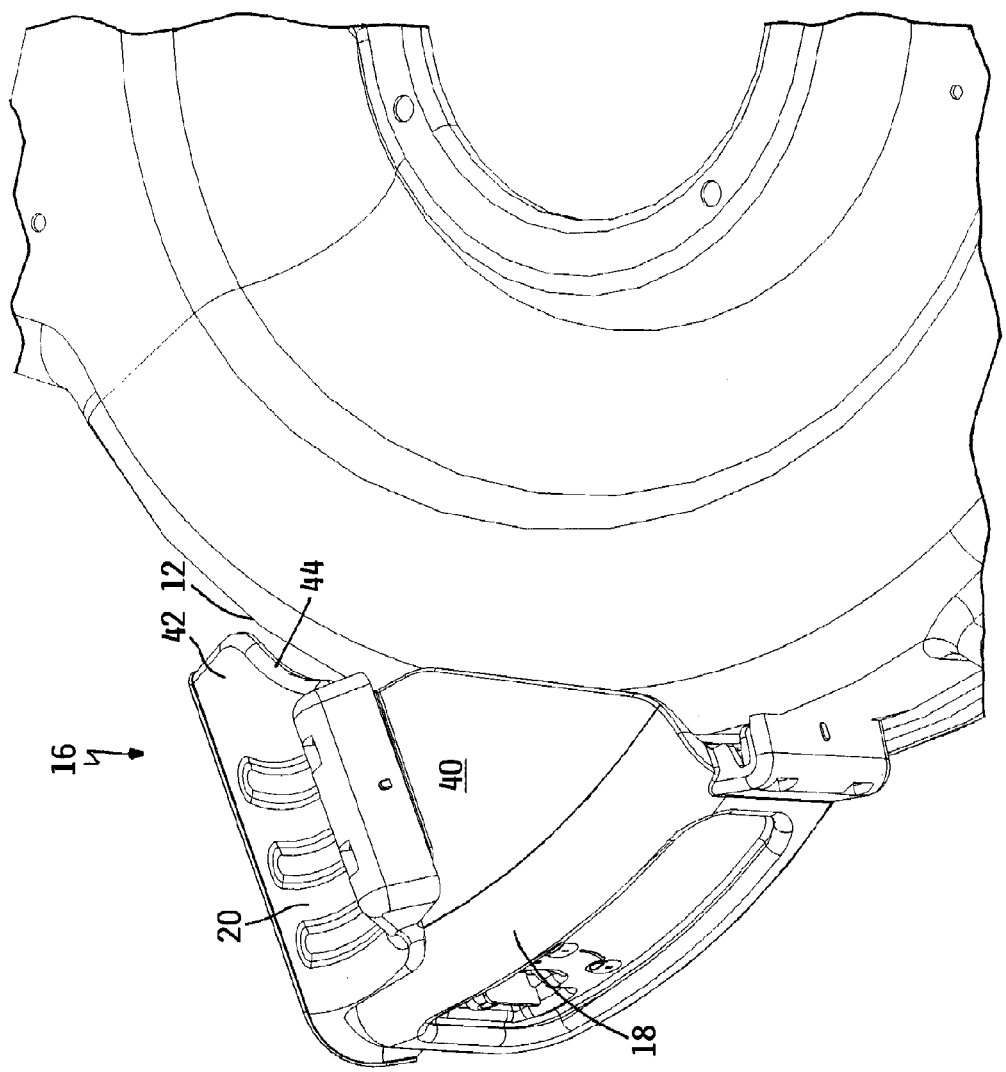
FIG. 7 is a perspective view of the discharge chute in the open position thereof looking from the front and from above the discharge chute.

In the open position of discharge chute 16, shown in FIGS. 5-7, side door 18 has now been pivoted outwardly relative to sidewall 12 about the vertical pivot axis y so that side door 18 has swung away from and opened discharge opening 14. The amount of this movement is far enough so that top deflector 20, which is carried on side door 18 and moves with side door 18, clears sidewall 12 of mower 2. As soon as it does so, top deflector 20 can pivot downwardly relative to side door 18 about the substantially horizontal pivot axis x. The pivotal lowering of top deflector 20 can occur through the force of gravity acting on the mass of top deflector 20. Alternatively, a torsion spring (not shown) can be used around the pivot (not shown) that secures top deflector 20 to side door 18 such that the bias of the spring tends to rotate top deflector 20 in a downward direction. Again, the pivotal lowering movement of top deflector 20 can occur only after top deflector 20 clears sidewall 12 of mower 2, whether such lowering movement occurs only because of gravity or is also spring assisted.

Figure 4:
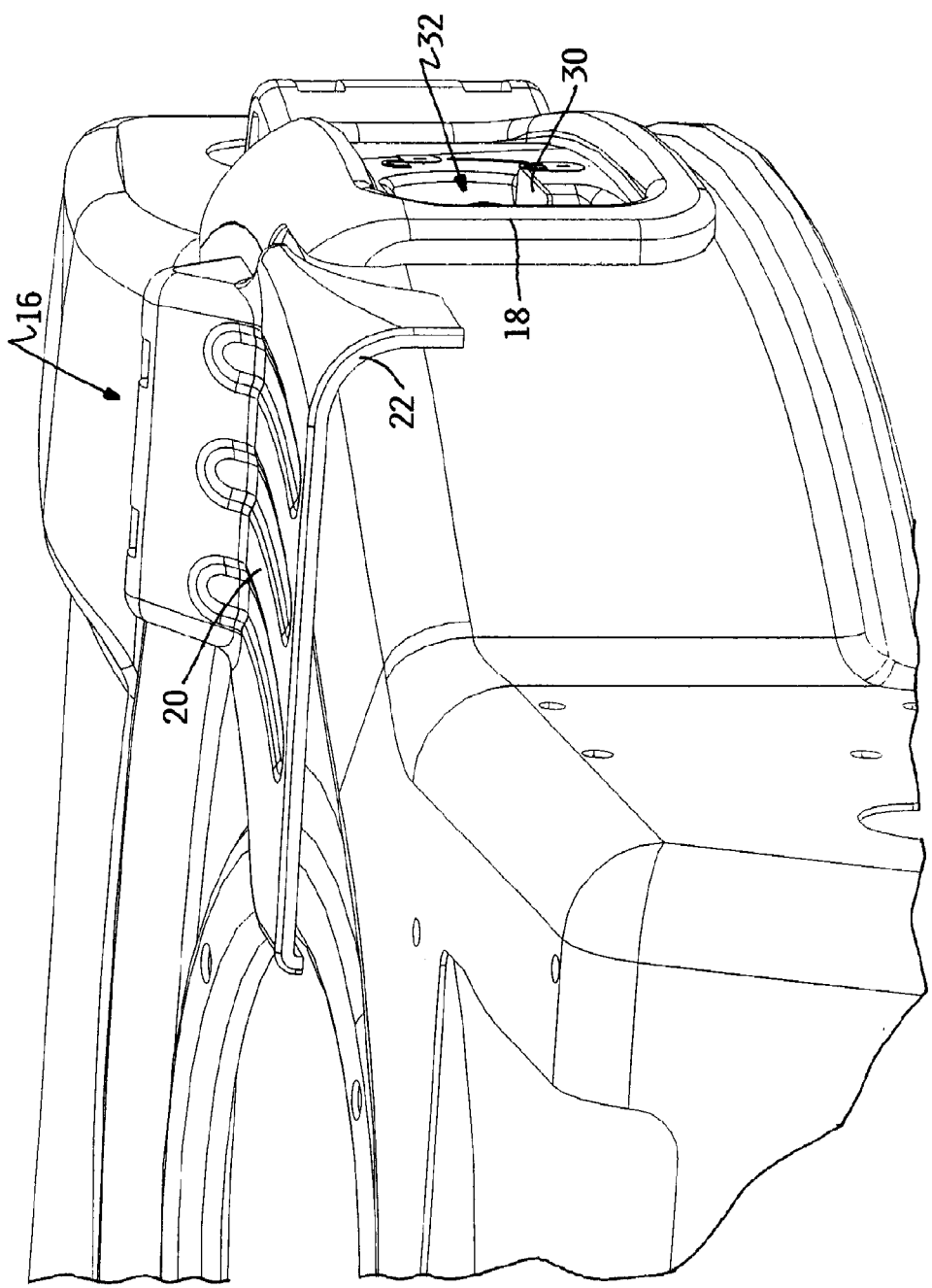
FIG. 4 is a perspective view of the discharge chute in the closed position thereof looking forwardly from behind the discharge chute.

A latch 24 is provided on side door 18 for locking or retaining side door 18 in the closed position thereof shown in FIGS. 2-4. Latch 24 comprises a simple latch plate 26 that is rotatable about a horizontal pivot 28 on side door 18. An engaged position of latch 24 is shown in FIGS. 2-4. As shown in FIG. 3, when latch 24 is in the engaged position, one end of latch plate 26 is positioned behind the rear edge 15 of discharge opening 14 to lock side door 18 against sidewall 12 of mower 2.

Latch plate 26 includes a perpendicular flange 30 that forms a handle to allow a user to manipulate latch 24. With latch 24 in its engaged position as shown in FIG. 3, the user can grip latch flange 30 and rotate latch 24 90° in the direction of the arrow A to move latch plate 26 from a horizontal to a vertical orientation. When latch plate 26 is in the vertical orientation as shown in FIG. 5, latch 24 is in a disengaged position since the end of latch plate 26 has been moved out of its abutment with rear edge 15 of discharge opening 14. In the disengaged position of latch 24, the user can then pull side door 18 away from sidewall 12 of mower 2, again by using latch flange 30 as a handle and by pulling outwardly on latch flange 30. Latch plate 26 is conveniently mounted in a recess 32 in the outer face of side door 18. Side door 18 may include suitable graphical or verbal indicia 34 to indicate the engaged and disengaged positions of latch 24.

Side door 18 is pivotally connected to sidewall 12 of mower 2 by a pivot bracket 36 on sidewall 12, pivot bracket 36 being visible in FIG. 3. Pivot bracket 36 has a pair of aligned openings 38 that define the substantially vertical pivot axis y of side door 18. Side door 18 will be pivotally secured to pivot bracket 36 by a separate pivot pin (not shown) passing through openings 38 or by molded pivot protrusions (not shown) on side door 18 which protrusions are received in openings 38. A torsion spring (not shown) is preferably used in conjunction with the pivot for side door 18 tending to rotate side door 18 towards its closed position.

Side door 18 is provided with a substantially horizontal top flange 40 on the inner side thereof. Flange 40 is high enough to slide over top wall 10 of mower 2 when side door 18 is in the closed position thereof as shown in FIG. 2. A pivot bracket (not shown) that is similar to pivot bracket 36 in FIG. 3 extends transversely horizontally on top flange 40 of side door 18 adjacent the rear edge of top flange 40. This pivot bracket serves to pivotally mount top deflector 20 to side door 18 for pivotal motion about the substantially horizontal pivot axis x.

Referring now to FIG. 7, when discharge chute 16 is in the open position thereof and top deflector 20 has moved into its lowered position relative to side door 18, any upper gap or opening that would be present between side door 18 and top wall 10 of mower 2 has substantially been filled in or covered by top flange 40 of side door 18 and by top deflector 20 itself. Top deflector 20 includes an extended curved inner section 42 that reaches back towards sidewall 12 until the curved inner edge 44 of the inner section is proximate to sidewall 12. Thus, any grass clippings being discharged by discharge chute 16 in the open position thereof are blocked from being thrown upwardly.

To move discharge chute 16 from its closed position shown in FIGS. 2-4 to the open position shown in FIGS. 5-7, the user first grips latch flange 30 on latch 24 and rotates latch 24 by 90° in the direction of the arrow A in FIG. 3 to disengage latch 24. The user can then pull outwardly on side door 18, against the bias of any torsion spring(s) tending to hold side door 18 closed, by pulling outwardly on latch flange 30 to swing side door 18 away from sidewall 12 of mower 2. Once side door 18 is swung away far enough for top deflector 20 to clear sidewall 12, top deflector 20 will then pivot or lower downwardly to interpose itself between side door 18 and sidewall 12 of mower 2. If the user then releases latch flange 30, the spring bias on side door 18 will simply abut inner edge 44 of inner section 42 of top deflector 20 against sidewall 12 of mower 2. This retains discharge chute 16 in its open position.

When side door 18 is in the open position, grass clippings will flow out of the cutting chamber through the rear gap g between side door 18 and discharge opening 14. Rear gap g is best shown in FIG. 6. The grass clippings can not be thrown upwardly since upward movement of the grass clippings is blocked by top flange 40 of side door 18 and by top deflector 20. In addition, top deflector 20 has become inclined relative to the stream of grass clippings such that top deflector 20 lowers as it extends rearwardly and faces into the grass clippings. Thus, top deflector 20 serves to direct the stream of grass clippings downwardly as indicated by the arrows B in FIGS. 5 and 6 in a direction that discharges the grass clippings rearwardly and downwardly along one side of mower 2.

To reclose discharge chute 16, the user simply grabs the rear edge of top deflector 20 and lifts top deflector 20 upwardly until top deflector 20 is at or slightly above top wall 10 of the cutting chamber. The spring bias on side door 18 will then automatically cause side door 18 to pivot inwardly back into its closed position with top deflector 20 sliding back in over top wall 10 of the cutting chamber as side door 18 closes. If spring biasing is not used on side door 18, then the user would manually push side door 18 inwardly back to its closed position. Once side door 18 is back in place in its closed position abutting or adjacent to sidewall 12 of mower 2, the user can then grip latch flange 30 and pivot latch 24 back into its engaged position to lock or retain side door 18, and hence discharge chute 16, in its closed position.

Various modifications of the invention will be apparent to those skilled in the art. Thus, the scope of the invention is not to be limited to the details of the preferred embodiment described herein.

We claim:

1. An improved lawn mower of the type having a downwardly facing cutting chamber that includes a top wall and a circumferential sidewall, the sidewall having a side discharge opening therein, and further including a side discharge chute having a closed position in which the discharge opening is covered and closed off and an open position in which the discharge opening is uncovered to allow grass clippings circulating inside the cutting chamber to flow through the uncovered discharge opening and to thereby exit the cutting chamber, wherein the improvement relates to the side discharge chute which comprises:
    (a) a side door that pivots on the sidewall of the cutting chamber about a substantially vertical pivot axis, wherein the side door in the closed position of the discharge chute lies adjacent the sidewall to overlie and close off the discharge opening, and wherein the side door in the open position of the discharge chute has been pivoted outwardly relative to the sidewall about the vertical pivot axis so that the side door has swung away from and opened the discharge opening; and
    (b) a top deflector that pivots on the side door about a substantially horizontal pivot axis, wherein the top deflector in the closed position of the discharge chute rests atop the top wall of the cutting chamber, and wherein the top deflector in the open position of the discharge chute has cleared the top wall of the cutting chamber to be able to pivot downwardly relative to the side door about the substantially horizontal pivot axis.

2. The lawn mower of claim 1, wherein the top deflector pivots downwardly relative to the top wall of the cutting chamber after it has cleared the top wall of the cutting chamber into an inclined position facing the flow of grass clippings exiting the cutting chamber to deflect such grass clippings downwardly towards the ground.

3. The lawn mower of claim 2, in which the top deflector in the inclined position thereof is sandwiched at least partially between the side door and the sidewall of the cutting chamber.

4. The lawn mower of claim 2, wherein the top deflector in the inclined position has an inner side that substantially conforms to the shape of the sidewall of the cutting chamber with the inner side also being substantially immediately adjacent the sidewall of the cutting chamber.

5. The lawn mower of claim 1, wherein the substantially vertical pivot axis is located between a front portion of the side door and the sidewall of the cutting chamber, and wherein the substantially horizontal pivot axis is located between a rear portion of the side door and a front portion of the top deflector.

* * * * *